(12) United States Patent
Hayakawa

(10) Patent No.: US 7,452,004 B2
(45) Date of Patent: Nov. 18, 2008

(54) PIPE CONNECTING STRUCTURE

(75) Inventor: Shoji Hayakawa, Koga (JP)

(73) Assignee: Sanoh Industrial Co., Ltd., Ibaraki-ken (JP)

( * ) Notice: Subject to any disclaimer, the term of this patent is extended or adjusted under 35 U.S.C. 154(b) by 0 days.

(21) Appl. No.: 10/552,619

(22) PCT Filed: Dec. 26, 2003

(86) PCT No.: PCT/JP03/16890

§ 371 (c)(1),
(2), (4) Date: Aug. 31, 2006

(87) PCT Pub. No.: WO2004/090407

PCT Pub. Date: Oct. 21, 2004

(65) Prior Publication Data

US 2007/0108765 A1    May 17, 2007

(30) Foreign Application Priority Data

Apr. 8, 2003   (JP) .............................. 2003-103529

(51) Int. Cl.
*F16L 25/01* (2006.01)
*F16L 33/18* (2006.01)
*F16L 13/14* (2006.01)

(52) U.S. Cl. .......................... 285/55; 285/347; 285/382; 285/423

(58) Field of Classification Search .................. 285/55, 285/233, 329, 347, 382, 422, 423, 923
See application file for complete search history.

(56) References Cited

U.S. PATENT DOCUMENTS

| | | | | | |
|---|---|---|---|---|---|
| 1,837,103 | A | * | 12/1931 | Betz | 285/229 |
| 2,273,154 | A | * | 2/1942 | Stromsoe | 285/55 |
| 3,363,680 | A | * | 1/1968 | Baker | 165/158 |
| 3,508,766 | A | * | 4/1970 | Berg et al. | 285/21.1 |
| 3,943,273 | A | * | 3/1976 | de Putter | 174/84 S |
| 3,989,280 | A | * | 11/1976 | Schwarz | 285/55 |
| 4,277,091 | A | * | 7/1981 | Hunter | 285/55 |
| 4,396,213 | A | * | 8/1983 | Hawkins | 285/289.3 |
| 4,850,621 | A | * | 7/1989 | Umehara | 285/322 |
| 5,622,394 | A | * | 4/1997 | Soles et al. | 285/256 |
| 5,890,287 | A | * | 4/1999 | Fukaya | 29/890.14 |
| 5,992,898 | A | * | 11/1999 | Saylor | 285/55 |
| 6,059,338 | A | * | 5/2000 | Diederichs | 285/55 |
| 6,149,206 | A | * | 11/2000 | DiRocco | 285/305 |
| 6,848,725 | B2 | * | 2/2005 | Logan et al. | 285/382 |
| 2004/0077194 | A1 | * | 4/2004 | Otto et al. | 439/100 |
| 2004/0201214 | A1 | * | 10/2004 | Logan et al. | 285/351 |

FOREIGN PATENT DOCUMENTS

| JP | 11-280580 A | 10/1999 |
|---|---|---|
| JP | 2001-41388 A | 2/2001 |
| JP | 2003-206818 A | 7/2003 |
| JP | 2003-254185 A | 9/2003 |

\* cited by examiner

*Primary Examiner*—James M Hewitt
(74) *Attorney, Agent, or Firm*—Posz Law Group, PLC

(57) ABSTRACT

A pipe connecting structure which can prevent electrical charge of a plastic coated metal pipe using a simple structure. The structure includes beads 5*a*, 5*b*, 5*c* protruding from the outer surface of the end of a plastic coated metal tube 3, which is obtained by coating the outside of a bare metal pipe 1 with a nonconductive plastic film 2. The plastic film 2 is removed from the tip of the bead 5*a* to expose the circumferential surface of the bare metal pipe 1, the exposed portion is made to contact the inner surface of a conductive tube 4, and the plastic coated metal tube 3 and the conductive tube 4 are connected together.

11 Claims, 3 Drawing Sheets

PIPE CONNECTING STRUCTURE

TECHNICAL FIELD

The present invention relates to a pipe connecting structure, and more particularly to a pipe connecting structure in which a conductive tube is fitted onto a plastic coated metal tube obtained by coating the outside of a bare metal pipe with a nonconductive plastic film, to connect the conductive tube and the plastic coated metal tube.

BACKGROUND ART

Pipes in vehicles which are exposed outside of the vehicle body such as fuel lines and pneumatic or hydraulic lines for brakes are made from sufficiently strong metal tubes for locations which are exposed to flying gravel or the like during driving, and are made from plastic tubes in other locations. Furthermore, metallic tubes and plastic tubes are connected together by fitting the end of the plastic tube onto the end of the metal tube (for example, refer to Japanese Patent Publication 2673418).

Incidentally, the metal tubes which are used for automotive fuel lines are covered with a corrosion resistant nonconductive plastic such as polyamide to prevent salt damage and corrosion from battery fluid and cleaning liquids or the like.

On the other hand, for fuel lines, there is a risk that static electricity will be generated by the friction caused by the flow resistance or the like of the fuel lines when fuel from the fuel tank is discharged by the pump, and that the plastic covering will be damaged by sparking.

Therefore, plastic coated metal tubes which are covered with a nonconductive plastic have a portion of the plastic covering removed to prevent electrical charge so that the exposed bare metal pipe can directly contact with a conductive bracket or the like, and the static electricity will escape through this bracket to the vehicle body or the like.

Therefore, an electric charge resistant structure for a plastic coated metal tube is complicated.

Therefore, with the foregoing in view, an object of the present invention is to provide a pipe connecting structure for a pipe which can achieve electrical charge resistance for a plastic coated metal tube using a simple structure.

DISCLOSURE OF THE INVENTION

With the pipe connecting structure of the present invention, a bead is provided to protrude from the outside surface of the end of a plastic coated metal tube obtained by coating the outside of a bare metal pipe with a nonconductive plastic film, and the plastic film only at the tip of the bead(s) is removed so that the circumferential surface of the bare metal pipe is exposed, and a seal member is arranged at a position nearer to the leading edge of the conductive plastic tube than the exposed region, and this exposed region is made to contact the inside surface of a conductive tube, thus connecting the plastic coated metal tube and the conductive plastic tube.

With another pipe connecting structure of the present invention, bead(s) are provided to protrude from the outer surface of the end of a plastic coated metal tube obtained by coating the outside of a bare metal pipe with a nonconductive plastic film, the plastic film is removed only from the tip of the beads to expose the circumferential surface of the bare metal pipe, the exposed portion is made to contact the inner surface of a conductive tube, by fusing the conductive plastic tube and the plastic coated metal tube together at a position nearer to the leading edge of the conductive plastic tube than the exposed region, thus connecting the plastic coated metal tube and the conductive tube together.

With the present inventions, a bare metal pipe can be formed on a plastic coated metal tube so that both tubes can be electrically connected simply by fitting a conductive plastic tube over the plastic coated metal tube where the bare metal pipe is exposed, and therefore electrically connecting both tubes is extremely simple. In addition, a seal member can be provided along a length of the coated metal pipe adjacent the exposed metal.

Furthermore, the static electricity of the plastic coated metal tube can escape through the electrically connected conductive plastic tube, so a special electrical charge preventing construction is not necessary.

Examples of the aforementioned conductive tube include metal tubes as well as conductive plastic tubes formed from conductive plastic.

Because of the elasticity of the plastic of the conductive plastic tube the conductive plastic tube will be in close contact with the bare metal pipe which is exposed by the bead, and both tubes can positively be electrically connected.

With the above invention, with if the bead is formed around the total circumference of the plastic coated metal tube, the conductive plastic tube will be in close contact around the whole circumference of the bare metal pipe, and therefore a sealing effect can also be anticipated.

BEST MODE FOR CARRYING OUT THE INVENTION

Figure 1:
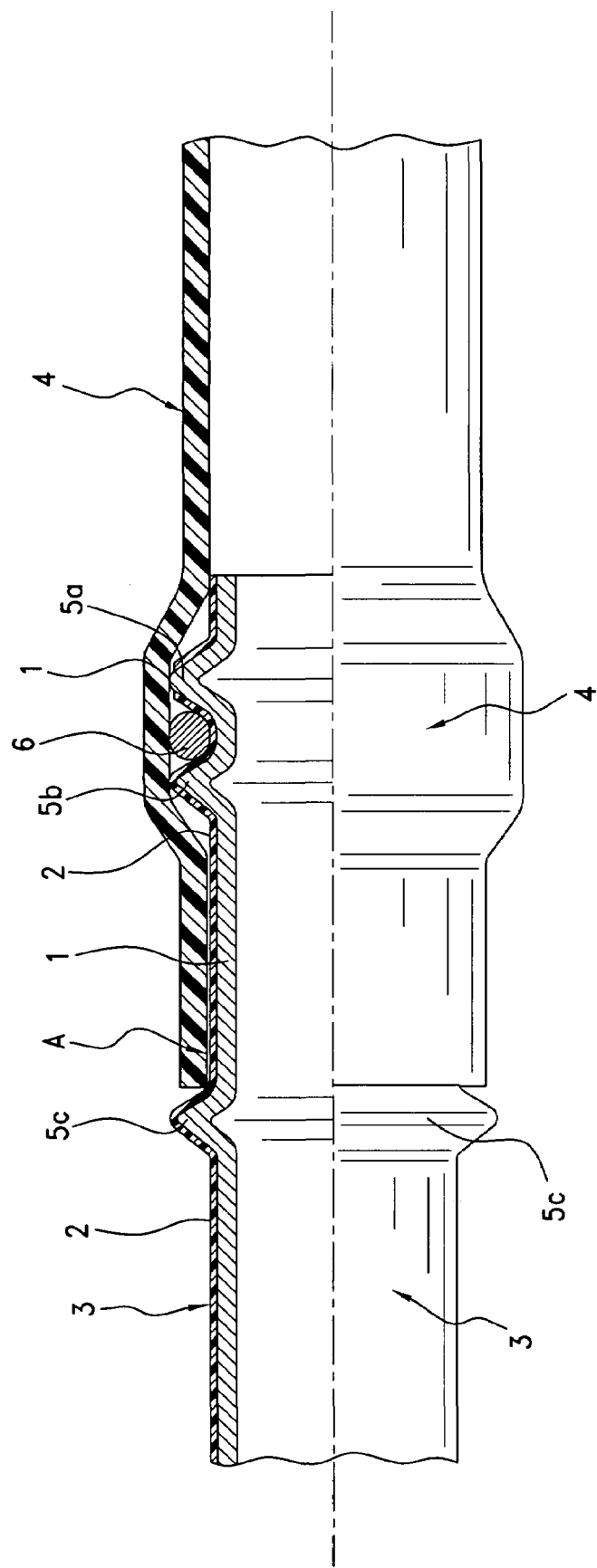
FIG. 1 is a partial half cut cross-section view showing an embodiment of the pipe connecting structure of the present invention.

The pipe connecting structure of the present invention will be described in detail based on preferred embodiments shown in the drawings, but the present invention is not restricted to these embodiments.

Figure 2:
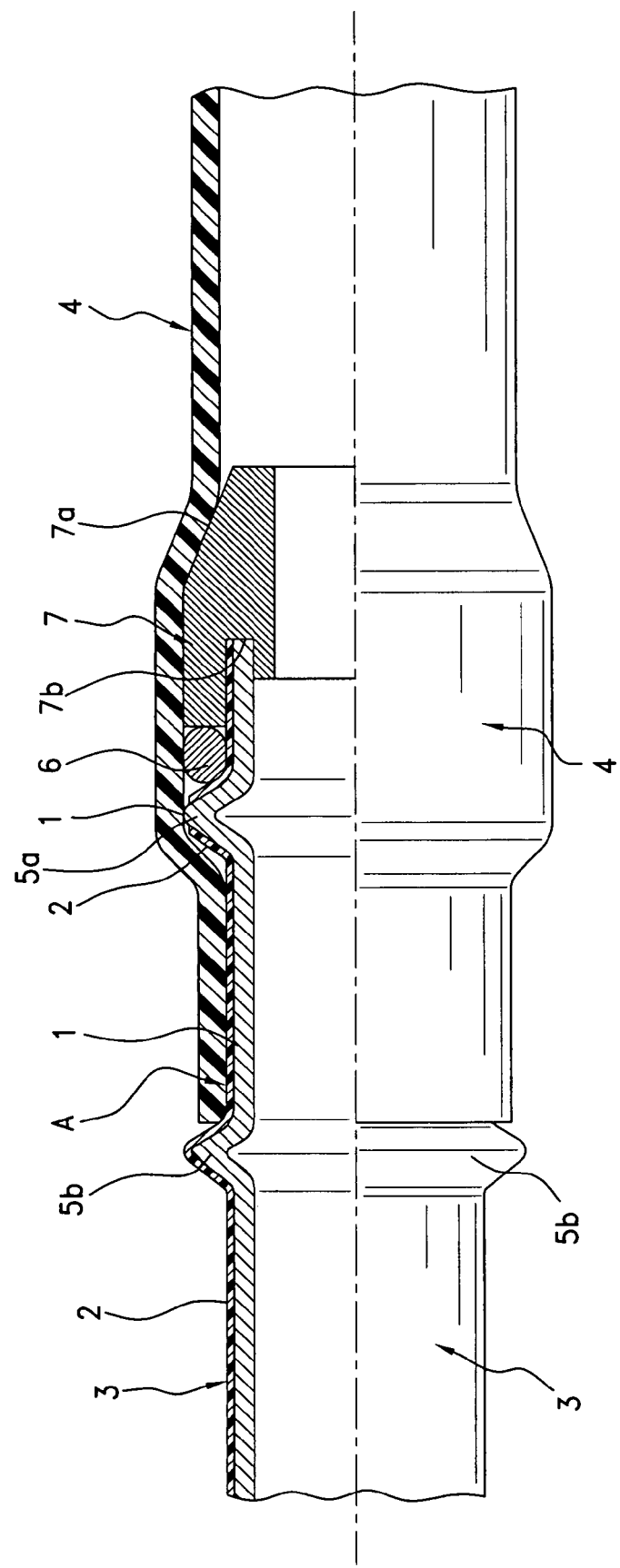
FIG. 2 is a partial half cut cross-section view showing another embodiment of the pipe connecting structure of the present invention.
Figure 3:
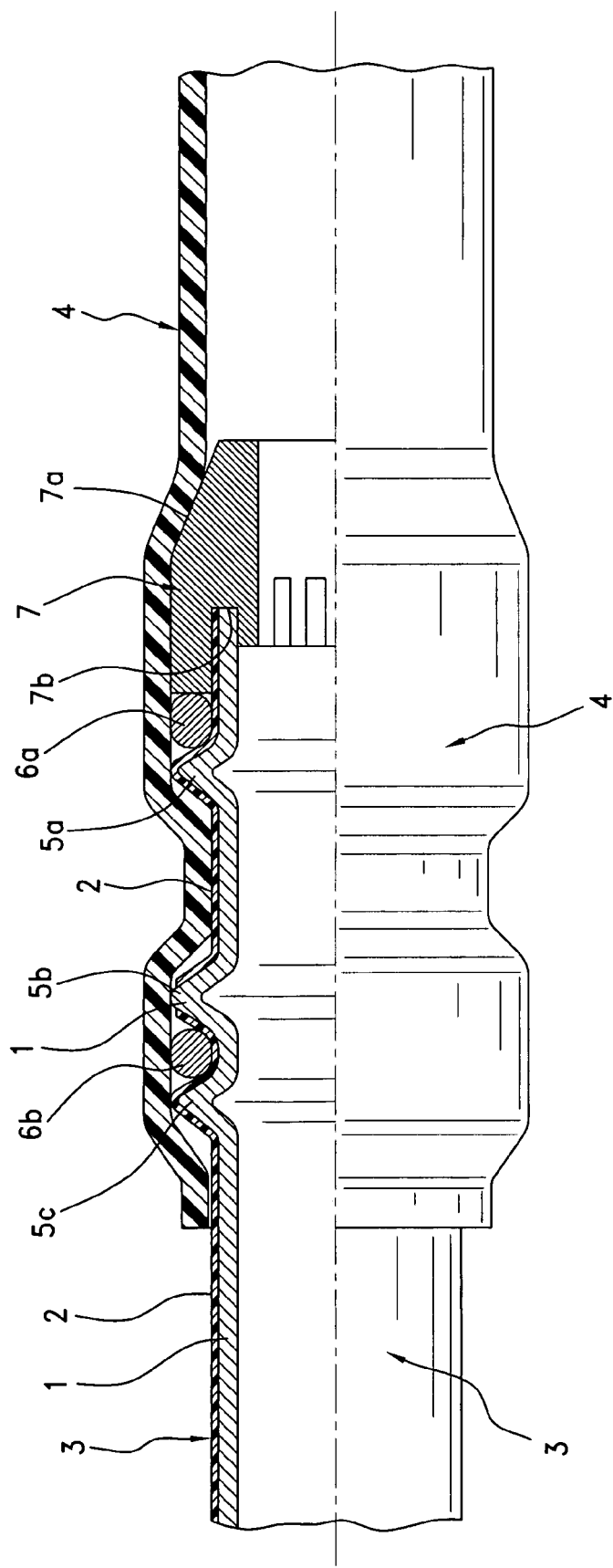
FIG. 3 is a partial half cut cross-section view showing yet another embodiment of the pipe connecting structure of the present invention.

FIG. 1 through FIG. 3 are partial half cross-section views showing various embodiments of the pipe connecting structure of the present invention, and the pipe connecting structures shown in FIG. 1 through FIG. 3 show a connection form comprising a plastic coated metal tube 3 made by coating a bare metal pipe 1 made of steel which has been coated by plating on the outside surface, and also coated with a nonconductive plastic film 2 such as polyamide, and a conductive plastic tube 4 made by mixing a conductive material such as carbon fiber or the like.

With the connection structure of FIG. 1, beads 5a, 5b, 5c are formed in three locations around the whole circumference of the end of the plastic coated metal tube 3. In the plastic coated metal tube 3, the plastic film 2 at the tip of the bead 5a is cut off so that the bare metal pipe 1 is exposed in this area. Furthermore, sealing material 6 is stored between two beads 5a, 5b. Furthermore, the end of the conductive plastic tube 4 is fit over the end of the plastic coated metal tube 3.

With the plastic coated metal tube 3 and the conductive plastic tube 4 which are connected in this manner, the position of the leading edge of the conductive plastic tube 4 will be determined by the bead 5c of the plastic coated metal tube 3, the inner surface of the conductive plastic tube 4 will be press fit and electrically connected to the bare metal pipe 1 exposed at one bead 5a, and the sealing material 6 will make a seal.

Note, if the plastic coated metal tube 3 and the conductive plastic tube 4 are fused together at the leading edge A of the conductive plastic tube 4, water penetration from the gap between the conductive plastic tube 4 and the plastic coated metal tube 3 can positively be prevented.

With the connection structure of FIG. 2, beads 5a, 5b are formed around the whole circumference of the end of the plastic coated metal tube 3 in two locations. In the plastic coated metal tube 3, the plastic film 2 on the tip of the bead 5a is cut away so that the bare metal pipe 1 is exposed in this location. Furthermore, the leading edge of the plastic coated metal tube 3 has a plastic guide cap 7. This guide cap 7 has a taper surface 7a which becomes narrower towards the leading edge, the base edge has a groove 7b, the plastic coated metal tube 3 is fixed in place by fitting the leading edge of the plastic coated metal tube 3 into this groove 7b, and sealing material 6 is stored between the guide cap 7 and the bead 5a.

Therefore, with this connection structure, using cap 7 as a guide, the leading edge of the plastic coated metal tube 3 is inserted into the end of the conductive plastic tube 4, and the end of the conductive plastic tube 4 will fit onto the end of the plastic coated metal tube 3.

With the plastic coated metal tube 3 and the conductive plastic tube 4 which are connected in this manner, the position of the leading edge of the conductive plastic tube 4 will be determined by the bead 5b of the plastic coated metal tube 3, the inner surface of the conductive plastic tube 4 will be press fit and electrically connected to the bare metal pipe 1 exposed at the bead 5a, and the sealing material 6 will make a seal.

Note, with this connection structure as well, if the plastic coated metal tube 3 and the conductive plastic tube 4 are fused together at the leading edge A of the conductive plastic tube 4, water penetration from the gap between the conductive plastic tube 4 and the plastic coated metal tube 3 can positively be prevented.

Furthermore, with the connection structure of FIG. 3, beads 5a, 5b, 5c are formed around the whole circumference of the end of the plastic coated metal tube 3 in three locations. In the plastic coated metal tube 3, the plastic film 2 on the tip of the bead 5b is cut away so that the bare metal pipe 1 is exposed in this location. Furthermore, the leading edge of the plastic coated metal tube 3 has a plastic guide cap 7. This guide cap 7 has a taper surface 7a which becomes narrower towards the leading edge, the base edge has a groove 7b, the plastic coated metal tube 3 is fixed in place by fitting the leading edge of the plastic coated metal tube 3 into this groove 7b. Furthermore, sealing material 6a is stored between the bead 5a and the guide cap 7, and a sealing material 6b is stored between bead 5b and bead 5c.

Furthermore, with this connection structure, using 7 has a guide, the leading edge of the plastic coated metal tube 3 is inserted into the end of the conductive plastic tube 4, and the end of the conductive plastic tube 4 will fit onto the end of the plastic coated metal tube 3.

With the plastic coated metal tube 3 and the conductive plastic tube 4 which are connected in this manner, the inner surface of the conductive plastic tube 4 will be press fit and electrically connected to the bare metal pipe 1 exposed at the bead 5b, and the sealing materials 6a, 6b will make a seal.

Note, with each of the above embodiments, protruding beads 5a, 5b, 5c were established in two or three locations on the plastic coated metal tube 3, and the plastic film 2 at the tip of one of these beads was removed to expose the bare metal pipe 1, thereby electrically connecting to the conductive plastic tube 4, but the plastic film 2 may also be removed to expose the bare metal pipe 1 at the other beads as well in order to electrically connect to the conductive plastic tube 4.

Furthermore, if a plurality of protracting beads are established on the plastic coated metal tube 3, the bead which is electrically connected to the conductive plastic tube 4 is preferably formed to be taller (larger diameter) than the other beads, so that tight contact can be maintained with the conductive plastic tube 4 when the plastic film 2 is removed to expose the bare metal pipe 1.

Furthermore, in the aforementioned embodiments, the bead 5a, 5b, 5c are formed around the whole circumference of the plastic coated metal tube 3, but it is also acceptable to be intermittently formed at near periodic intervals across a portion of the whole circumference.

Furthermore, if the guide cap 7 shown in FIG. 2 and FIG. 3 is formed from a conductive material such as conductive plastic or metal, the plastic coated metal tube 3 and the conductive plastic tube 4 can be electrically connected by the guide cap 7 as well.

INDUSTRIAL APPLICABILITY

With the aforementioned pipe connecting structure of the present invention, electrical charge prevention of a plastic coated metal tube can be accomplished using a simple structure, and can therefore be suitably used for connecting plastic coated metal tubes such as automotive fuel lines and pneumatic or hydraulic lines for brakes.

The invention claimed is:

1. A pipe connecting structure, comprising:
   a plastic coated metal pipe including at least one bead circumferentially protruding from the pipe, the plastic coating on the metal pipe being a nonconductive plastic film, and the at least one bead including bare metal exposed above the nonconductive plastic film; and
   a conductive plastic tube, the conductive plastic tube having an end portion with a leading edge, wherein the plastic coated metal pipe and the conductive plastic tube are fused together, and the exposed bare metal of the at least one bead contacts the conductive plastic tube.

2. The pipe connecting structure according to claim 1, wherein the conductive plastic tube is press fitted about the plastic coated metal pipe.

3. The pipe connecting structure according to claim 1, wherein a seal member is arranged around the metal pipe, on top of the non-conductive plastic film, and along the length of the plastic coated metal pipe between the exposed bare metal of the plastic coated metal pipe and the fused position of the plastic coated metal pipe and the conductive plastic tube.

4. The pipe connecting structure according to claim 1, wherein the at least one bead extends around an entire circumference of the plastic coated metal tube.

5. The pipe connecting structure according to claim 1, further comprising a plastic guide cap arranged on the end of the plastic coated metal pipe, the plastic guide cap having a tapered surface fitting within the conductive plastic tube.

6. A pipe connecting structure, comprising:
   a metal pipe including at least one bead circumferentially protruding from the metal pipe;
   a nonconductive plastic film coated on an outer surface of the metal pipe at locations other than an upper portion of the at least one bead of the metal pipe, the upper portion of the at least one bead of the metal pipe being exposed through the nonconductive plastic film;

a seal member arranged around the metal pipe on top of the nonconductive plastic film; and a conductive plastic tube, wherein the exposed upper portion of the at least one bead of the metal pipe contacts the conductive plastic tube, and the seal member contacts both the conductive plastic tube and the nonconductive plastic film coating on the metal pipe along a length of the metal pipe adjacent the exposed upper portion of the at least one bead of the metal pipe.

7. The pipe connecting structure according to claim 6, wherein the seal member is arranged along the length of the metal pipe between the upper portion of the at least one bead of the metal pipe and an end of the metal pipe.

8. The pipe connecting structure according to claim 6, wherein the at least one bead of the metal pipe is arranged along the length of the metal pipe between the seal member and an end of the metal pipe.

9. The pipe connecting structure according to claim 6, wherein the at least one bead extends around an entire circumference of the plastic coated metal tube.

10. The pipe connecting structure according to claim 6, wherein the at least one bead with the upper portion exposed is larger than another bead circumferentially protruding from a surface of the metal pipe.

11. The pipe connecting structure according to claim 6, further comprising a plastic guide cap arranged on the end of the metal pipe, the plastic guide cap having a tapered surface fitting within the conductive plastic tube, and a second seal member arranged along the length of the pipe adjacent the at least one bead.

* * * * *